(12) United States Patent
Zhang et al.

(10) Patent No.: US 6,842,673 B2
(45) Date of Patent: Jan. 11, 2005

(54) ENGINE ENGAGEMENT CONTROL FOR A HYBRID ELECTRIC VEHICLE

(75) Inventors: Rongjun Zhang, Santa Rosa, CA (US); Mark Leonard Hopper, Ypsilanti, MI (US); Stephen De La Salle, Danbury Essex (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 129 days.

(21) Appl. No.: 10/162,927

(22) Filed: Jun. 5, 2002

(65) Prior Publication Data

US 2003/0229429 A1 Dec. 11, 2003

(51) Int. Cl.[7] .................................................. G06F 7/00

(52) U.S. Cl. ............................ 701/22; 701/70; 477/67; 180/65.2; 290/40 A; 290/40 B; 290/40 C

(58) Field of Search ................................ 701/70, 22, 1, 701/36; 477/67, 5, 3; 180/65.2, 65.1; 290/40 A, 40 B, 40 C; 123/90.15, 179.3, 179.4; 318/632

(56) References Cited

U.S. PATENT DOCUMENTS

| | | | |
|---|---|---|---|
| 4,753,078 A | 6/1988 | Gardner, Jr. .................. | 60/668 |
| 4,809,803 A | 3/1989 | Ahern et al. ................ | 180/65.4 |
| 5,368,000 A | 11/1994 | Koziara ....................... | 123/481 |
| 5,469,820 A | 11/1995 | Data et al. ................... | 123/192 |
| 5,606,946 A | 3/1997 | Data et al. ............... | 123/198 G |
| 5,619,956 A | 4/1997 | Koziara et al. ........... | 123/61.31 |
| 5,909,720 A * | 6/1999 | Yamaoka et al. .......... | 123/179.3 |
| 5,984,034 A | 11/1999 | Morisawa et al. ......... | 180/65.2 |
| 6,013,992 A | 1/2000 | Ishikawa et al. ........ | 123/198 E |
| 6,018,199 A | 1/2000 | Shiroyama et al. ....... | 123/41.31 |
| 6,018,694 A | 1/2000 | Egami et al. .............. | 180/65.2 |
| 6,026,921 A | 2/2000 | Aoyama et al. ............ | 180/652 |
| 6,053,842 A | 4/2000 | Kitada et al. ................... | 677/5 |
| 6,054,776 A | 4/2000 | Sumi .......................... | 290/17 |
| 6,054,844 A | 4/2000 | Frank ............................ | 477/5 |
| 6,081,042 A | 6/2000 | Tabata et al. .................. | 290/17 |
| 6,083,138 A | 7/2000 | Aoyama et al. ............. | 180/652 |
| 6,102,144 A | 8/2000 | Lutz ........................... | 180/65.2 |
| 6,110,066 A | 8/2000 | Nedungadi et al. ............ | 290/17 |
| 6,119,799 A | 9/2000 | Morisawa et al. .............. | 477/5 |
| 6,123,163 A | 9/2000 | Otsu et al. .................. | 180/65.8 |
| 6,131,538 A | 10/2000 | Kanai ............................. | 123/2 |
| 6,137,250 A | 10/2000 | Hirano et al. ............... | 318/376 |
| 6,149,544 A | 11/2000 | Masberg et al. .............. | 477/13 |

(List continued on next page.)

FOREIGN PATENT DOCUMENTS

| | | |
|---|---|---|
| EP | 0 984 147 A2 | 3/2000 |
| EP | 0 989 300 A2 | 3/2000 |
| EP | 1 002 689 A2 | 5/2000 |
| EP | 1 008 484 A2 | 6/2000 |
| EP | 1 026 807 A2 | 8/2000 |
| EP | 1 036 695 A2 | 9/2000 |
| JP | 2000 078705 | 3/2000 |
| JP | 2000 115911 | 4/2000 |
| JP | 2001 037006 | 2/2001 |
| WO | WO 00/15455 | 3/2000 |
| WO | WO 00/21770 | 4/2000 |
| WO | WO 00/25417 | 5/2000 |

*Primary Examiner*—Thomas G. Black
*Assistant Examiner*—Ronnie Mancho
(74) *Attorney, Agent, or Firm*—Brinks Hofer Gilson & Lione

(57) ABSTRACT

A control system is disclosed for minimizing the driveline vibrations in a hybrid electric vehicle during engine engagement. The control system involves determining the speed of the electric motor and taking the derivative of the speed to determine the acceleration. A signal representing the acceleration is created. The acceleration signal is filtered. The filtered acceleration signal is used to calculate a feedback control term through a controller. The controller can be either a PD controller or a PID controller with a low integral gain. The feedback control term is used to adjust the output torque of the electric motor to suppress the vibrations caused by engine engagement.

23 Claims, 1 Drawing Sheet

U.S. PATENT DOCUMENTS

| | | | |
|---|---|---|---|
| 6,166,517 A | 12/2000 | Wakashiro et al. | 123/192 |
| 6,173,574 B1 | 1/2001 | Obayashi et al. | 123/481 |
| 6,176,807 B1 | 1/2001 | Oba et al. | 320/104 |
| 6,176,808 B1 * | 1/2001 | Brown et al. | 477/5 |
| 6,183,389 B1 | 2/2001 | Tabata | 477/5 |
| 6,184,603 B1 | 2/2001 | Hamai et al. | 477/5 |
| 6,202,776 B1 | 3/2001 | Masberg et al. | 180/65.2 |
| 6,209,672 B1 | 4/2001 | Severinsky | 180/65.2 |
| 6,217,479 B1 | 4/2001 | Brown et al. | 477/86 |
| 6,233,508 B1 | 5/2001 | Deguchi et al. | 701/22 |
| 6,244,368 B1 | 6/2001 | Ando et al. | 180/65.2 |
| 2001/0020789 A1 * | 9/2001 | Nakashima | 290/40 C |
| 2002/0190683 A1 * | 12/2002 | Karikomi et al. | 318/632 |

* cited by examiner

ENGINE ENGAGEMENT CONTROL FOR A HYBRID ELECTRIC VEHICLE

The invention relates to a hybrid electric vehicle, and particularly to a control system for controlling driveline vibrations in a hybrid electric vehicle.

BACKGROUND OF THE INVENTION

Hybrid electric vehicles (HEVs) are known to include two sources of power to drive the vehicle. In one configuration, one power source for the HEV is a combustion engine and the other power source is an electric motor. Typically, the combustion engine is powered by fuel that is stored in a fuel tank and the electric motor is powered by an electric energy storage element.

It is also known that during operation of a HEV there are times when only the electric motor is powering the vehicle. However, when the amount of power required by the vehicle exceeds a certain threshold, defined by what the electric motor is capable of providing, the internal combustion engine fires to supply the additional power. The process of starting the internal combustion engine is referred to as engine engagement.

The engine engagement process is noisy and invokes severe vibrations due to engine friction before the engine fires and the surge after the engine fires. These vibrations are transmitted to the driveline and are ultimately felt by the driver and passengers of the vehicle.

It is desirable to minimize vibrations during engine engagement. In fact, it is a critical issue relevant to driver comfort, product quality and overall competitiveness for hybrid electric vehicle systems.

SUMMARY OF THE INVENTION

The present invention resolves the problems outlined above by providing an engine engagement control for a hybrid electric vehicle. More specifically, this invention includes a control system for minimizing the vibrations produced during engine engagement.

The control system of the present invention will control the output torque of the electric motor to offset the vibrations caused by the engine engaging with the driveline. In other words, the driveline vibrations occurring during engine engagement are minimized.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

The following description of the preferred embodiment of the invention is not intended to limit the invention to this preferred embodiment, but rather to enable a person skilled in the art of hybrid electric vehicles to make and use this invention.

Figure 1:
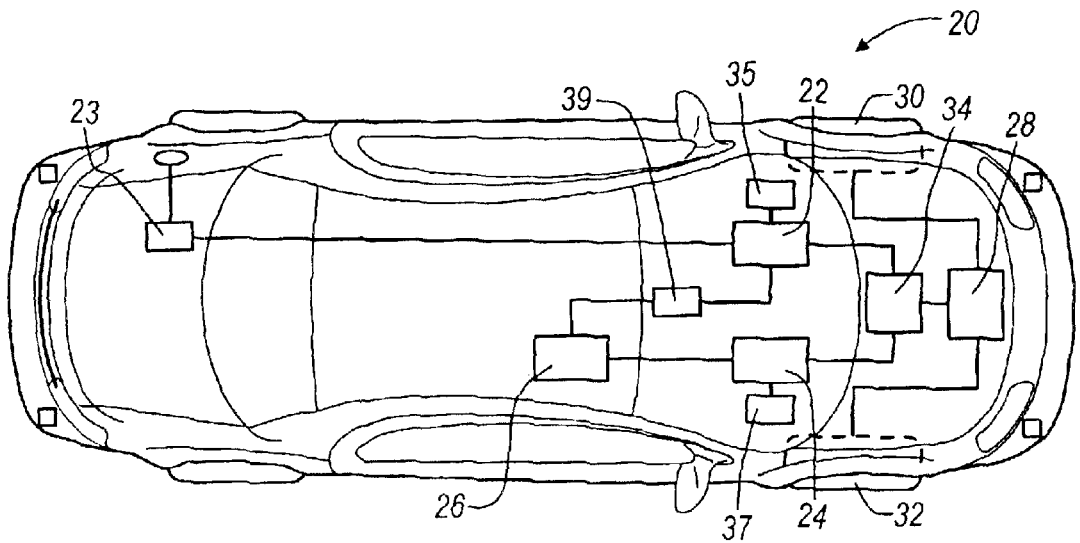
FIG. 1 is a schematic view of an embodiment of the present invention.

FIG. 1 schematically illustrates what is commonly referred to as a parallel hybrid electric vehicle or a parallel system driveline vehicle, shown generally at 20. The vehicle 20 includes a combustion engine 22, a fuel tank 23 for housing fuel to power the combustion engine 22, an electric motor 24, an energy storage element 26 to power the electric motor 24, and a transmission 28 to turn the wheels 30, 32 of the vehicle 20. Further there is a connection mechanism 34 that connects with the combustion engine 22, electric motor 24 and transmission 28. In a parallel arrangement, the connection mechanism 34 allows either the electric motor 24, the combustion engine 22 or both to power the vehicle 20 at any given time.

The combustion engine could be, but is not limited to, an internal combustion engine or a diesel engine. Similarly, the energy storage element could be, but is not limited to, a battery or capacitor.

There is also an engine controller 35 and an electric motor controller 37. The electric motor controller 37 controls the functioning of the electric motor 24 by determining correct current and voltage commands for the motor 24 based on the motor torque control commands.

The electric motor 24 output is mechanically connected via the connection mechanism to the output of the combustion engine 22 to negatively reinforce torque spikes. For this to work, the connection mechanism 34 needs to be of a certain type. However, it should be noted that various design options can be used for the connection mechanism.

One option is a differential that receives power from two sources but has only one output. In this case, if one of the power sources is deactivated a one way clutch would still allow torque to be transmitted through the differential, The connection mechanism could also be either a mechanical clutch or any other device that is capable of performing this function.

The vehicle may also include an engine driven alternator 39 that supplies electricity to the battery. Alternatively, the electric motor can run as its own alternator.

In one embodiment of the present invention, solely the electric motor 24 is used to supply power the vehicle 20. At some point, additional power is required. Additional power may be required to further power the vehicle 20 or because certain accessories may be activated. Therefore, the engine 22 will be started to provide the required additional power that the electric motor 24 is not capable of providing. This process is referred to as engine engagement.

At the beginning of the engine engagement process, only the electric motor is rotating to provide power to the vehicle. At this point the combustion engine is fully disengaged and, is therefore, not rotating.

When additional power is required, the connection mechanism will engage with the engine to bring the engine from rest, or zero rotational speed, up to an operating speed. Once the engine begins rotating and obtains a predetermined rotational speed, fuel is supplied to the engine and sparking occurs to cause the engine to begin producing power. At this point, the engine is fully engaged.

Severe vibrations occur and noise is produced during engine engagement. There are several types of loads that cause excessive vibrations during the engine engagement process. One type of load is an inertial load and another type of load is a firing load inertial loads occur when the connection mechanism is engaging the engine and thus rotates the engine. Firing loads occur once the engine begins to receive fuel and starts firing. As a result of the firing of the fuel, the engine begins producing torque at a high rate. The control system of the present invention will work to minimize vibrations in the driveline caused by both of these types of loads.

The vibrations that are caused by these loads during engine engagement are undesirable because they are transmitted to the vehicle's driveline and are felt by the driver and passengers in the vehicle.

The control system of the present invention operates by detecting these vibrations and adjusting the output of the electric motor 24 to offset them. Therefore, this invention is directed to a control system for controlling the output of the electric motor 24 to minimize the vibrations in the vehicle's driveline. Preferably, the control system of the present invention is used in a hybrid electric vehicle having one electric motor.

Figure 2:
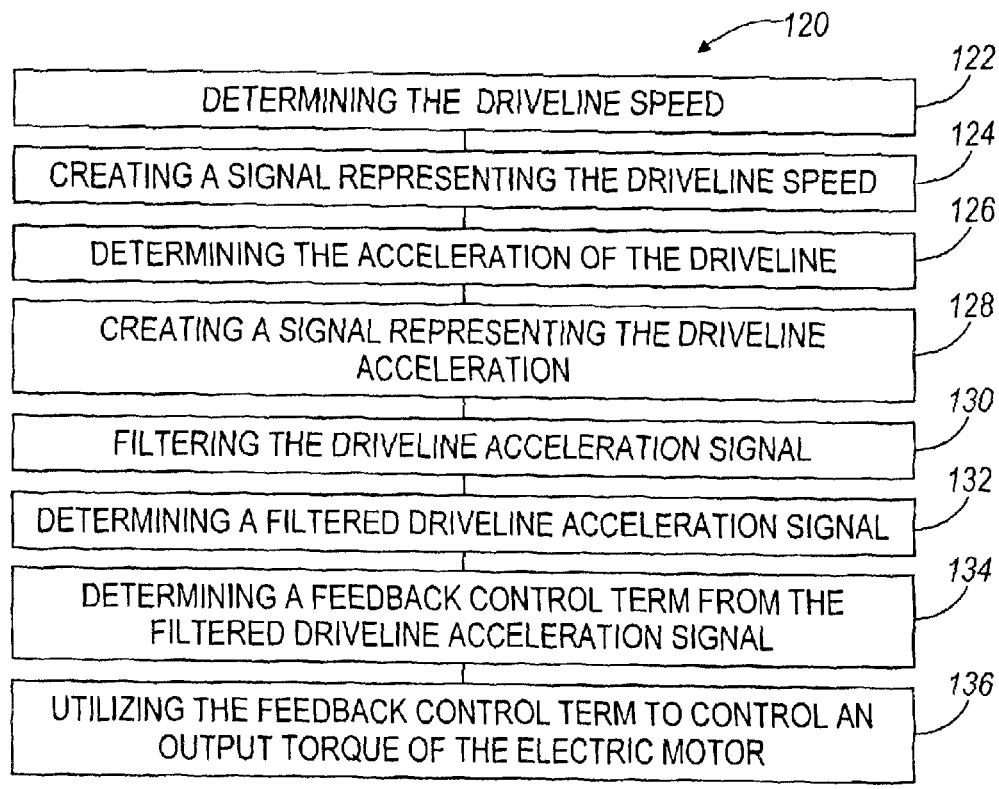
FIG. 2 is a flowchart illustrating the method of the present invention.

FIG. 2 depicts a flowchart illustrating the control system, shown generally at 120. The driveline speed is determined at 122. There are several different ways to determine this value. A sensor can be used to detect either the position or speed of the electric motor's output shaft. Alternatively, a sensor can be used to detect either the position or speed of either the transmissions' input shaft or output shaft. If a position is determined, its derivative must be taken to determine the corresponding speed. Yet another alternative is to determine the driveline speed by making an estimate based on the electric motor's current/voltage information. A signal is created representing the driveline speed at 124.

The acceleration of the driveline is determined from the driveline speed signal at 126. The driveline acceleration is calculated by taking the derivative of the driveline speed. A signal representing the driveline acceleration is created at 128.

Alternatively, the acceleration of the driveline can be obtained through a direct measurement of acceleration by use of at least one sensor. Again, the acceleration measurement can be detected at several different locations so long as there is no nonlinear mechanism between the motor shaft and engine shaft. In other words, the motor shaft and the engine shaft must be rotating at the same speed. Some possible locations include detecting acceleration of the motor shaft, transmission input or output shaft, or engine shaft. The acceleration signal does not have to be real-time. So long as the signal delay is insignificant, the control performance can be preserved. Preferably, the signal delay should be less than ⅒ of the engine engagement duration, or 0.3–0.4 seconds.

There is yet another way to obtain either the acceleration signal or the velocity signal. Either signal can be generated through observers or any form of estimator, based on several different types of sensor outputs and the driveline dynamics equations.

Although any driveline sensor can be used for this control strategy, high-resolution sensors will improve the control performance.

The driveline acceleration signal is filtered at 130. The acceleration signal is filtered to filter out the high frequency noise that is commonly found in acceleration signals. Preferably it is low pass filtered. A filtered driveline acceleration signal is determined at 132.

Alternatively, the high-pass filtered driveline acceleration signal could be replaced by the high-pass filtered speed signal. The driveline acceleration signal through a low pass filter equals functionally to the driveline speed through a high pass filter. The low pass filtered acceleration signal and the high pass filtered speed signal are equivalent so long as the cut-off frequencies match. Therefore, the control command can also be generated by using the driveline speed signal in 124.

The filtered acceleration signal is fed through a controller to determine a feedback control term at 134. The controller can be either a PD controller or a PID controller with low integral gain. The PD or PID controller could also be presented in an approximate form, such as lead/lag compensator. The lead/lag compensator can be the approximation of a derivative/integral control. The controller can also be designed using other methodologies rather than PD/PID, including but not limited to, nonlinear control, robust control, and adaptive control.

The feedback control term is fed to a controller for the electric motor. The feedback control term will be processed by the electric motor controller and direct the electric motor to output a certain torque calculated to reduce the overall driveline vibrations at 136. Preferably, the vibration control strategy is included in the motor controller because the vibration suppression requires fast response.

The electric motor controller could be a DC brush motor controller, a vector motor controller for AC induction motor, a PM synchronous motor or a switch reluctance motor.

In terms of function, the electric motor could be a traction motor, integrated starter/generator motor, or a smart starter motor that can perform torque rejection. In terms of motor type, the electric motor could be any type of motor, including but not limited to, an AC induction motor, PM DC/brushless/synchronous motor, switch reluctance motor, stepper motor, or DC brushed motor While the above description constitutes the preferred embodiment of the present invention, it will be appreciated that the invention is susceptible to modification variation and change without departing from the proper scope and fair meaning of the accompanying claims.

What is claimed is:

1. A method for minimizing driveling vibrations during engine engagement in a hybrid electric vehicle of the type having a parallel system driveline including an electric motor and a combustion engine, the method comprising:
   determining the acceleration of the vehicle's driveline;
   creating a signal representing the driveline acceleration;
   filtering the driveline acceleration signal to filter out high frequency noise in the signal;
   determining a feedback control term from the filtered driveline acceleration signal; and
   utilizing a feedback control term to control an output torque of the electric motor to minimize driveline vibrations.

2. The method of claim 1 wherein the vehicle's driveline acceleration is determined by determining the acceleration of the vehicle's electric motor.

3. The method of claim 1 further comprising:
   determining the electric motor speed;
   creating a signal representing the electric motor speed; and
   wherein the acceleration of the driveline is determine from the electric motor speed signal.

4. The method of claim 1 wherein the vehicle's driveline acceleration is determined by a sensor.

5. The method of claim 1 wherein the filtered driveline acceleration signal is low-pass filtered.

6. The method of claim 1 wherein the feedback control term is determined using a PD controller.

7. The method of claim 1 wherein the feedback control term is determined using a PID controller with low integral gain.

8. The method of claim 1 wherein the feedback control term is determined using a nonlinear controller.

9. The method of claim 1 wherein the feedback control term is determined using a robust controller.

10. The method of claim 1 wherein the feedback control term is determined using an adaptive controller.

11. The method of claim 1 wherein the hybrid electric vehicle is a parallel configuration.

12. A method for minimizing driveline vibrations in a hybrid electric vehicle including an internal combustion engine and an electric motor, the method comprising:

activating the electric motor;

activating the internal combustion engine after the electric motor has been activated;

determining the electric motor speed;

determining the acceleration of the electric motor by taking the derivative of the electric motor speed;

creating a signal representing the electric motor acceleration;

filtering the electric motor acceleration signal;

determining a filtered electric motor acceleration signal;

determining the vibrations of the electric motor by taking the derivative of the electric motor acceleration;

creating a signal representing the electric motor vibrations; and utilizing the vibration signal to determine an adjusted output torque of the electric motor to minimize driveline vibrations.

13. The method of claim 12 further comprising creating a signal representing the electric motor speed.

14. A method for minimizing driveline vibrations in a hybrid electric vehicle including an internal combustion engine and an electric motor, the method comprising:

determining the speed of the driveline by determining the speed of a transmission shaft;

creating a signal representing the driveline speed;

filtering the driveline speed;

determining a feedback control term from the filtered driveline speed signal; and utilizing a feedback control term to control an output torque of the electric motor to minimize driveline vibrations.

15. The method of claim 14 wherein the driveline speed signal is determined by determining the speed of a transmission input shaft.

16. The method of claim 14 wherein the driveline speed signal is determined by determining the speed of a transmission output shaft.

17. Th method of claim 14 wherein the driveline speed is determined by a sensor.

18. The method of claim 14 wherein the driveline speed signal is high-pass filtered.

19. The method of claim 14 wherein the feedback control term is determined using a PD controller.

20. The method of claim 14 wherein the feedback control term is determined using a PID controller.

21. The method of claim 14 wherein the feedback control term is determined using a nonlinear controller.

22. The method of claim 14 wherein the feedback control term is determined using a robust controller.

23. The method of claim 14 wherein the feedback control term is determined using an adaptive controller.

* * * * *

UNITED STATES PATENT AND TRADEMARK OFFICE
CERTIFICATE OF CORRECTION

PATENT NO. : 6,842,673 B2
DATED : January 11, 2005
INVENTOR(S) : Rongjun Zhang et al.

It is certified that error appears in the above-identified patent and that said Letters Patent is hereby corrected as shown below:

Column 4,
Line 32, delete "driveling" and substitute -- driveline -- in its place.

Column 6,
Line 59, before "method" delete "Th" and substitute -- The -- in its place.

Signed and Sealed this

Sixth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,842,673 B2  Page 1 of 1
APPLICATION NO. : 10/162927
DATED : January 11, 2005
INVENTOR(S) : Rongjun Zhang et al.

It is certified that error appears in the above-identified patent and that said Letters Patent is hereby corrected as shown below:

<u>Column 4,</u>
Line 32, delete "driveling" and substitute -- driveline --.

<u>Column 6,</u>
Line 59, before "method" delete "Th" and substitute -- The --.

This certificate supersedes Certificate of Correction issued September 6, 2005.

Signed and Sealed this

Twenty-seventh Day of June, 2006

JON W. DUDAS
*Director of the United States Patent and Trademark Office*